United States Patent
Allen et al.

(10) Patent No.: US 9,251,474 B2
(45) Date of Patent: Feb. 2, 2016

(54) REWARD BASED RANKER ARRAY FOR QUESTION ANSWER SYSTEM

(71) Applicant: International Business Machines Corporation, Armonk, NY (US)

(72) Inventors: Corville O. Allen, Morrisville, NC (US); Kyle L. Croutwater, Chapel Hill, NC (US); Dwi Sianto Mansjur, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 406 days.

(21) Appl. No.: 13/798,417

(22) Filed: Mar. 13, 2013

(65) Prior Publication Data

US 2014/0272884 A1     Sep. 18, 2014

(51) Int. Cl.
*G06N 99/00*     (2010.01)
*G09B 7/04*      (2006.01)

(52) U.S. Cl.
CPC ............... *G06N 99/005* (2013.01); *G09B 7/04* (2013.01)

(58) Field of Classification Search
None
See application file for complete search history.

(56) References Cited

U.S. PATENT DOCUMENTS

| | | | |
|---|---|---|---|
| 7,107,254 B1 * | 9/2006 | Dumais et al. | 706/50 |
| 8,346,701 B2 | 1/2013 | Wang et al. | |
| 2009/0287678 A1 | 11/2009 | Brown et al. | |
| 2009/0292687 A1 | 11/2009 | Fan et al. | |
| 2011/0066587 A1 | 3/2011 | Ferrucci et al. | |
| 2011/0125734 A1 | 5/2011 | Duboue et al. | |
| 2012/0078891 A1 | 3/2012 | Brown et al. | |
| 2013/0018876 A1 | 1/2013 | Chu-Carroll et al. | |
| 2013/0263181 A1 * | 10/2013 | Impollonia et al. | 725/32 |
| 2015/0025106 A1 * | 1/2015 | Kwon et al. | 514/302 |

OTHER PUBLICATIONS

Lin, Xiaofan et al.; "Performance analysis of pattern classifier combination by plurality voting"; 2003; Elsevier; Pattern Recognition Letters 24; pp. 1959-1969.*
Ruta, Dymitr et al.; "Classifier selection for majority voting"; 2005; Elsevier; Information Fusion 6; pp. 63-81.*
U.S. Appl. No. 13/840,243, Mar. 15, 2013, 1 page.
U.S. Appl. No. 13/840,704, Mar. 15, 2013, 1 page.
"IBM Journal of Research and Development", IBM Corporation, vol. 56, No. 3/4, May/Jul. 2012, 208 pages.

* cited by examiner

*Primary Examiner* — Stanley K Hill
(74) *Attorney, Agent, or Firm* — Francis Lammes; Stephen J. Walder, Jr.; Reza Sarbakhsh

(57) ABSTRACT

Mechanisms are provided for configuring a ranker array of a question and answer (QA) system. An initial configuration of a ranker array of the QA system is generated which comprises a plurality of rankers with each ranker applying a statistical classification function to candidate answers generated by the QA system. A training question is input to the QA system to generate a training candidate answer set and the ranker array is applied to the training candidate answer set to generate, for each ranker in the ranker array, a ranked listing of candidate answers. For each ranker in the ranker array, a correctness of a corresponding ranked listing of candidate answers is determined and the ranker array is reconfigured based on results of the determined correctness of the corresponding ranked listing of candidate answers for each ranker in the ranker array.

19 Claims, 8 Drawing Sheets

400

```
IMPORT A DOCUMENT HAVING A SET OF QUESTIONS BASED ON THE CONTENT
OF THE DOCUMENT
405
            │
            ▼
AUTOMATICALLY CREATE A CANDIDATE QUESTION FROM THE CONTENT
410
            │
            ▼
AUTOMATICALLY GENERATE ANSWERS FOR THE SET OF QUESTIONS AND
CANDIDATE QUESTION USING THE CONTENT
415
            │
            ▼
PRESENT THE SET OF QUESTIONS, CANDIDATE QUESTION, AND ANSWERS TO
THE CONTENT CREATOR FOR VERIFICATION
420
            │
            ▼
STORE THE VERIFIED SET OF QUESTIONS IN THE DOCUMENT
425
```

*FIG. 4*

| | 630 | | |
|---|---|---|---|
| | RANKER 1 | RANKER 2 | RANKER 3 |
| QUALITY | 1 | 3 | 2 |

| 620 | |
|---|---|
| | TRUTH |
| CANDIDATE 1 | 1 |
| CANDIDATE 2 | 0 |
| CANDIDATE 3 | 1 |
| CANDIDATE 4 | 1 |
| CANDIDATE 5 | 1 |

| | 610 | | |
|---|---|---|---|
| | RANKER 1 | RANKER 2 | RANKER 3 |
| CANDIDATE 1 | 1 | 2 | 2 |
| CANDIDATE 2 | 2 | 1 | 1 |
| CANDIDATE 3 | 3 | 3 | 3 |
| CANDIDATE 4 | 4 | 4 | 5 |
| CANDIDATE 5 | 5 | 5 | 4 |
| | 612 | 614 | 616 |

*FIG. 6*

REWARD BASED RANKER ARRAY FOR QUESTION ANSWER SYSTEM

BACKGROUND

The present application relates generally to an improved data processing apparatus and method and more specifically to mechanisms for providing a reward based ranker array for a question and answer (QA) system, such as the Watson™ question and answer system available from International Business Machines Corporation of Armonk, N.Y.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

One such QA system is the Watson™ system available from International Business Machines (IBM) Corporation of Armonk, N.Y. The Watson™ system is an application of advanced natural language processing, information retrieval, knowledge representation and reasoning, and machine learning technologies to the field of open domain question answering. The Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

Various United States patent application Publications describe various types of question and answer systems. U.S. Patent Application Publication No. 2011/0125734 discloses a mechanism for generating question and answer pairs based on a corpus of data. The system starts with a set of questions and then analyzes the set of content to extract answer to those questions. U.S. Patent Application Publication No. 2011/0066587 discloses a mechanism for converting a report of analyzed information into a collection of questions and determining whether answers for the collection of questions are answered or refuted from the information set. The results data are incorporated into an updated information model.

SUMMARY

In one illustrative embodiment, a method, in a data processing comprising a processor and a memory, for configuring a ranker array of a question and answer (QA) system. The method comprises generating, by the data processing system, an initial configuration of a ranker array of the QA system. The ranker array comprises a plurality of rankers. Each ranker in the ranker array applies a statistical classification function to candidate answers generated by the QA system in response to an input question to generate a ranked listing of candidate answers. The method further comprises inputting, by the data processing system, a training question to the QA system to generate a training candidate answer set and applying, by the data processing system, the ranker array to the training candidate answer set to generate, for each ranker in the ranker array, a ranked listing of candidate answers in the training candidate answer set. Furthermore, the method comprises determining, by the data processing system, for each ranker in the ranker array, correctness of a corresponding ranked listing of candidate answers and reconfiguring, by the data processing system, the ranker array based on results of the determined correctness of the corresponding ranked listing of candidate answers for each ranker in the ranker array.

In other illustrative embodiments, a computer program product comprising a computer useable or readable medium having a computer readable program is provided. The computer readable program, when executed on a computing device, causes the computing device to perform various ones of, and combinations of, the operations outlined above with regard to one or more of the method illustrative embodiments.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to one or more of the method illustrative embodiments.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 depicts a flowchart diagram of one embodiment of a method for question/answer creation for a document;

FIG. 6 is an example diagram illustrating an example set of data structures used to generate a reward value in accordance with one illustrative embodiment;

DETAILED DESCRIPTION

Figure 1:
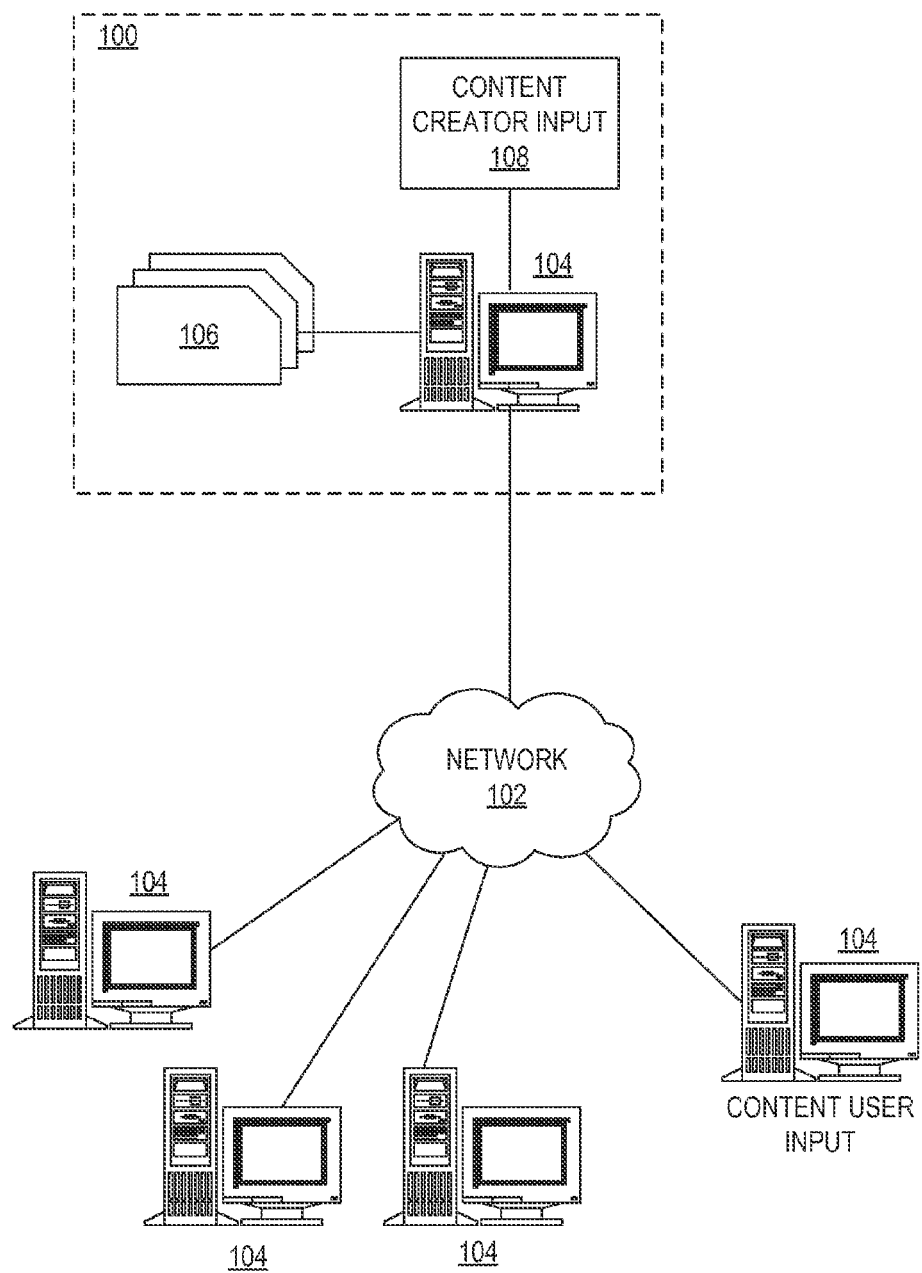
FIG. 1 depicts a schematic diagram of one illustrative embodiment of a question/answer (QA) system in a computer network.

As mentioned above, a question and answer (QA) system takes an input question, analyzes it, decomposes the question into constituent parts, generates one or more hypothesis, or candidate answers to the input question, based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure. In determining the various hypotheses, or candidate answers, and a final answer for the input question, a series of progressive calls to classifiers to nominate candidate answers is performed with a final single ranker being used to determine the final answer to the input question based on confidence measures for the various nominated candidate answers.

Since there is a single source of confidence measures, i.e. a single ranker, in the QA system pipeline, the quality of the results generated by the QA system is greatly dependent upon the logic and training of this single ranker and the degree to which the input question is directed to a same domain or knowledge area upon which the ranker was trained. Thus, if the ranker is trained on a training data set that is primarily comprised of a corpus of documents from a particular domain, e.g., medical documents, financial documents, or other industry specific documents, the ranker may be tuned for use with that particular domain and may not be as accurate when generating answers to questions posed in a different domain. This is especially troublesome in an open-domain QA system in which the QA system is expected to generate answers for input questions directed to various domains or knowledge areas. In such an open-domain QA system, the ranker cannot be trained upon only a subset of domains and be expected to provide adequately correct results for all possible domains from which input questions may be submitted. Moreover, training a single ranker using a generic data set that may comprise a large number of domains may not provide adequate training for any one domain in particular and thus, accuracy may again be less than optimal.

The illustrative embodiments replace a single ranker based QA system with a QA system implementing an array of rankers that may be individually trained on the same or different training data sets. Even in embodiments where the same training data set is used by all or a subset of the rankers in the array of rankers, the rankers may have different samplings of the training data set upon which they are trained and may utilize different classifiers, or trained statistical classification functions, for classifying the evidence from the corpus of information in support of/or contrary to, a candidate answer to generate a confidence measure value for the candidate answer.

Thus, the core concept of the illustrative embodiments is to utilize a combination of rankers, e.g., an array of rankers, with each ranker ranking each candidate answer and voting on each candidate answer based on the particular rankers' trained statistical classification function. That is, each ranker may apply its own trained statistical classification function to each candidate answer and the evidence in the corpus of information to determine a measure of confidence for each candidate answer as being the correct answer for an input question. This generates, for each ranker in the array of rankers, a corresponding ranked listing of candidate answers which may different from the ranked listing of candidate answers for other rankers in the array of rankers. These ranked listings of candidate answers may be different from one another by virtue of the differences in the statistical classification functions applied by the various rankers, the differences in the training applied to each of the rankers, the particular domain or knowledge areas for which each ranker has been specifically trained, or the like.

During training, or as input to the training mechanisms, a truth table is created that identifies the correct answer to the input question, since the correct answer is known a priori for purposes of training, i.e. a "golden" answer set is known by the training mechanisms and is provided as input. The truth table comprises, for a particular input question, entries for each of the candidate answers and corresponding truth values indicating, for the particular input question, which candidate answer is the correct answer (e.g., logic "0" value) and which candidate answers are incorrect (e.g., logic "1" value). Thus, based on the relative ranking of candidate answers by a particular ranker, and a comparison of this relative ranking to the truth table associated with the input question, it can be determined whether the ranker chose the correct candidate answer as its highest ranking candidate answer or not. Moreover, a relative value of "correctness" of the operation of the ranker may be determined by determining where in a ranker's ranked listing of candidate answers the correct answer was ranked to determine how well that particular ranker operated to determine an answer for the input question.

Each ranker also has an associated quality value associated with the ranker. The quality value associated with a ranker may be determined based on how accurate the ranker was in selecting the correct answer for the input question. That is, if a ranker chose the correct answer it is given a highest quality value for that input question. If a ranker did not choose the correct answer as the highest ranking candidate answer, a determination as to where in the ranking of candidate answers generated by the ranker the correct answer was ranked and based on this, a quality value for the ranker may be calculated. For example, if a first ranker chose the correct answer as a second highest candidate answer, and a second ranker chose the correct answer as a third highest candidate answer, then the first ranker would be assigned a higher quality value than the second ranker since the first ranker was "more correct" than the second ranker. These quality values may be accumulated over multiple iterations of training of the rankers such that the quality value for a ranker may be increased with each subsequent iteration of training in which the ranker chooses the correct answer or chooses the correct answer to be a higher ranked candidate answer in its corresponding ranked listing of candidate answers. Similarly, the quality value of the ranker may be decreased with each subsequent iteration of training in which the ranker fails to choose the correct answer or chooses the correct answer to be a lower ranked candidate answer in its corresponding ranked listing of candidate answers.

An overall reward value may be computed for individual rankers and for the array of rankers as a whole based on the ranker quality, the truth table values associated with the candidate answers for the input question, and the ranked listings of candidate answers generated by the particular ranker, or the rankers in the array. The reward value may be compared to a threshold reward value indicating whether the operation of the ranker, or the array of rankers, is acceptable. A continuous training methodology may be employed in which the training data set may be re-sampled into different sub-sets to produce better results and quality from each ranker until the reward value for the ranker, or the array of rankers, is at the acceptable threshold or better. Moreover, this continuous training methodology may involve modifying the array of rankers to be a different configuration of rankers, e.g., different number of rankers and different types of rankers, where a "type" of ranker refers to the particular domain or knowledge area that the ranker is configured or trained to work best with, such as by training the statistical classification function used by the ranker.

Once the array of rankers is trained such that it achieves the required threshold level or reward value, the array of rankers may be utilized to handle the generation of answers for actual input questions during runtime operation. In such a case, each ranker operates in parallel to determine a ranked listing of candidate answers for the input questions. A final answer may be selected from the ranked listing of candidate answers using any of a number of different methodologies including, for example, a simple majority vote mechanism in which the candidate answer that the majority of rankers in the array of rankers indicate to the candidate answer that is most highly ranked is selected as the final answer. Another methodology may be to average the ranks of each candidate answer across each of the rankers to generate an average ranking for each candidate answer and then selecting a candidate answer whose average ranking is highest. Other methodologies may also be used without departing from the spirit and scope of the illustrative embodiments.

Thus, using the array of rankers, each ranker, or subsets of rankers, may be tuned or trained for representing a particular domain or area of knowledge. The combination of the array of rankers may thus be used to provide a question and answer ranking mechanism that is applicable to multiple domains or areas of knowledge. This leads to a question and answer system that provides high quality answer results in a multiple-domain or even open-domain environment. One key advantage in a multiple-domain or open-domain QA system is improved performance. Such improved performance is achieved by the QA system of the illustrative embodiments in that multiple rankers are utilized which have been iteratively trained based on a reward value basis where the reward value is based on the ranks of candidate answers rather than the confidence scores associated with the candidate answers. This is important in that when different rankers are used in a heterogeneous array of rankers, the confidence scores may be computed differently by each ranker and thus, the confidence scores are not comparable across the different rankers. Hence, it is more accurate to base the reward value, indicative of the correctness of the operation of the ranker, based on the ranks of the candidate answers, their correspondence with the golden answer set, and the computed quality of the ranker itself over multiple iterations of the training.

Another key advantage of the illustrative embodiments is that the particular combination of different types of rankers that provides the best overall reward value may be identified and used during runtime. Thus, through a continuous training methodology, various numbers of rankers, various combinations of types of rankers, and the like, may be investigated to determine which combinations and numbers of rankers provide the best reward value. Thus, for example, a first combination of rankers of types A and B may be initially used and the numbers of each of the types A and B may be adjusted within predefined limits, e.g., from 1 to 10 rankers of each type, to generate different combinations of rankers and corresponding reward values. The reward values may be compared to identify which combination of rankers provides the best reward value. Similarly, additional types, e.g., C, D, and E, numbers of each type, and the like may be tried to generate reward values and identify the best combination of ranker types and ranker numbers for achieving the threshold or better reward value. In this way, the best array of rankers for use with the QA system may be identified. This identification of a best array of rankers may be identified with regard to particular domains or areas of knowledge as well. Thus, various arrays of rankers may be defined for different domains or knowledge areas of interest for use in dynamically modifying the QA system during runtime based on an identified domain/knowledge area of a particular input question.

These and other aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
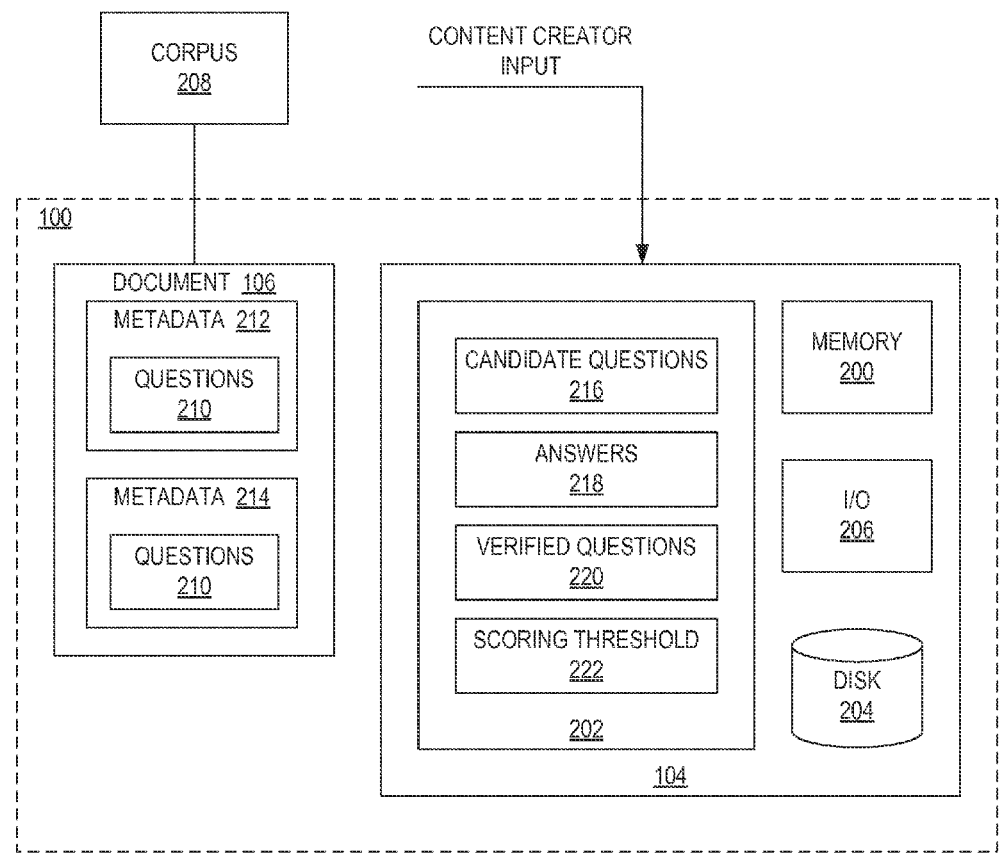
FIG. 2 depicts a schematic diagram of one embodiment of the QA system of FIG. 1.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIGS. 1-4 are directed to describing an example Question/Answer, Question and Answer, or Question Answering (QA) system, methodology, and computer program product with which the mechanisms of the illustrative embodiments may be implemented. As will be discussed in greater detail hereafter, the illustrative embodiments may be integrated in, and may augment and extend the functionality of, these QA mechanisms with regard to improving the results generated by the QA system using automated training mechanisms for training and selecting an array of rankers to be used in ranking candidate answers for input questions. Thus, it is important to first have an understanding of how question and answer creation may be implemented before describing how the mechanisms of the illustrative embodiments are integrated in and augment such question/answer (QA) systems. It should be appreciated that the QA mechanisms described in FIGS. 1-4 are only examples and are not intended to state or imply any limitation with regard to the type of QA mechanisms with which the illustrative embodiments may be implemented. Many modifications to the example QA system shown in FIGS. 1-4 may be implemented in various embodiments of the present invention without departing from the spirit and scope of the present invention.

QA mechanisms operate by accessing information from a corpus of data (or content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating question and answer pairs based on the corpus of data, verifying answers to a collection of questions for the corpus of data, correcting errors in digital text using a corpus of data, and selecting answers to questions from a pool of potential answers.

Content creators, such as article authors, may determine use cases for products, solutions, and services before writing their content. Consequently, the content creators may know what questions the content is intended to answer in a particular topic addressed by the content. Categorizing the questions, such as in terms of roles, type of information, tasks, or the like, associated with the question, in each document of a document corpus may allow the system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. The QA system 100 may include a computing device 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. The QA system 100 and network 102 may enable question/answer (QA) generation functionality for one or more content users. Other embodiments of the QA system 100 may be used with components, systems, subsystems, and/or devices other than those that are depicted herein.

The QA system 100 may be configured to receive inputs from various sources. For example, the QA system 100 may receive input from the network 102, a corpus of electronic documents 106 or other data, a content creator 108, content users, and other possible sources of input. In one embodiment, some or all of the inputs to the QA system 100 may be routed through the network 102. The various computing devices 104 on the network 102 may include access points for content creators and content users. Some of the computing devices 104 may include devices for a database storing the corpus of data. The network 102 may include local network connections and remote connections in various embodiments, such that the QA system 100 may operate in environments of any size, including local and global, e.g., the Internet.

In one embodiment, the content creator creates content in a document 106 for use with the QA system 100. The document 106 may include any file, text, article, or source of data for use in the QA system 100. Content users may access the QA system 100 via a network connection or an Internet connection to the network 102, and may input questions to the QA system 100 that may be answered by the content in the corpus of data. In one embodiment, the questions may be formed using natural language. The QA system 100 may interpret the question and provide a response to the content user containing one or more answers to the question. In some embodiments, the QA system 100 may provide a response to content users in a ranked list of answers.

FIG. 2 depicts a schematic diagram of one embodiment of the QA system 100 of FIG. 1. The depicted QA system 100 includes various components, described in more detail below, that are capable of performing the functions and operations described herein. In one embodiment, at least some of the components of the QA system 100 are implemented in a computer system. For example, the functionality of one or more components of the QA system 100 may be implemented by computer program instructions stored on a computer memory device 200 and executed by a processing device, such as a CPU. The QA system 100 may include other components, such as a disk storage drive 204, and input/output devices 206, and at least one document 106 from a corpus 208. Some or all of the components of the QA system 100 may be stored on a single computing device 104 or on a network of computing devices 104, including a wireless communication network. The QA system 100 may include more or fewer components or subsystems than those depicted herein. In some embodiments, the QA system 100 may be used to implement the methods described herein as depicted in FIG. 4 and may be augmented or configured to implement the additional operations, functionality, and features described hereafter with regard to improving the results generated by an QA system 100.

In one embodiment, the QA system 100 includes at least one computing device 104 with a processor 202 for performing the operations described herein in conjunction with the QA system 100. The processor 202 may include a single processing device or multiple processing devices. The processor 202 may have multiple processing devices in different computing devices 104 over a network such that the operations described herein may be performed by one or more computing devices 104. The processor 202 is connected to and in communication with the memory device. In some embodiments, the processor 202 may store and access data on the memory device 200 for performing the operations described herein. The processor 202 may also be connected to a storage disk 204, which may be used for data storage, for example, for storing data from the memory device 200, data used in the operations performed by the processor 202, and software for performing the operations described herein.

In one embodiment, the QA system 100 imports a document 106. The electronic document 106 may be part of a larger corpus 208 of data or content, which may contain electronic documents 106 related to a specific topic or a variety of topics. The corpus 208 of data may include any number of documents 106 and may be stored in any location relative to the QA system 100. The QA system 100 may be capable of importing any of the documents 106 in the corpus 208 of data for processing by the processor 202. The processor 202 may communicate with the memory device 200 to store data while the corpus 208 is being processed.

The document 106 may include a set of questions 210 generated by the content creator at the time the content was created. When the content creator creates the content in the document 106, the content creator may determine one or more questions that may be answered by the content or for specific use cases for the content. The content may be created with the intent to answer specific questions. These questions may be inserted into the content, for example, by inserting the set of questions 210 into the viewable content/text 214 or in metadata 212 associated with the document 106. In some embodiments, the set of questions 210 shown in the viewable text 214 may be displayed in a list in the document 106 so that the content users may easily see specific questions answered by the document 106.

The set of questions 210 created by the content creator at the time the content is created may be detected by the processor 202. The processor 202 may further create one or more candidate questions 216 from the content in the document 106. The candidate questions 216 include questions that are answered by the document 106, but that may not have been entered or contemplated by the content creator. The processor 202 may also attempt to answer the set of questions 210 created by the content creator and candidate questions 216 extracted from the document 106, "extracted" meaning questions that are not explicitly specified by the content creator but are generated based on analysis of the content.

In one embodiment, the processor 202 determines that one or more of the questions are answered by the content of the document 106 and lists or otherwise marks the questions that were answered in the document 106. The QA system 100 may also attempt to provide answers 218 for the candidate questions 216. In one embodiment, the QA system 100 answers 218 the set of questions 210 created by the content creator before creating the candidate questions 216. In another embodiment, the QA system 100 answers 218 the questions and the candidate questions 216 at the same time.

The QA system 100 may score question/answer pairs generated by the system. In such an embodiment, question/answer pairs that meet a scoring threshold are retained, and question/answer pairs that do not meet the scoring threshold 222 are discarded. In one embodiment, the QA system 100 scores the questions and answers separately, such that questions generated by the system 100 that are retained meet a question scoring threshold, and answers found by the system 100 that are retained meet an answer scoring threshold. In another embodiment, each question/answer pair is scored according to a question/answer scoring threshold.

After creating the candidate questions 216, the QA system 100 may present the questions and candidate questions 216 to the content creator for manual user verification. The content creator may verify the questions and candidate questions 216 for accuracy and relatedness to the content of the document 106. The content creator may also verify that the candidate questions 216 are worded properly and are easy to understand. If the questions contain inaccuracies or are not worded properly, the content creator may revise the content accordingly. The questions and candidate questions 216 that have been verified or revised may then be stored in the content of the document 106 as verified questions, either in the viewable text 214 or in the metadata 212 or both.

Figure 3:
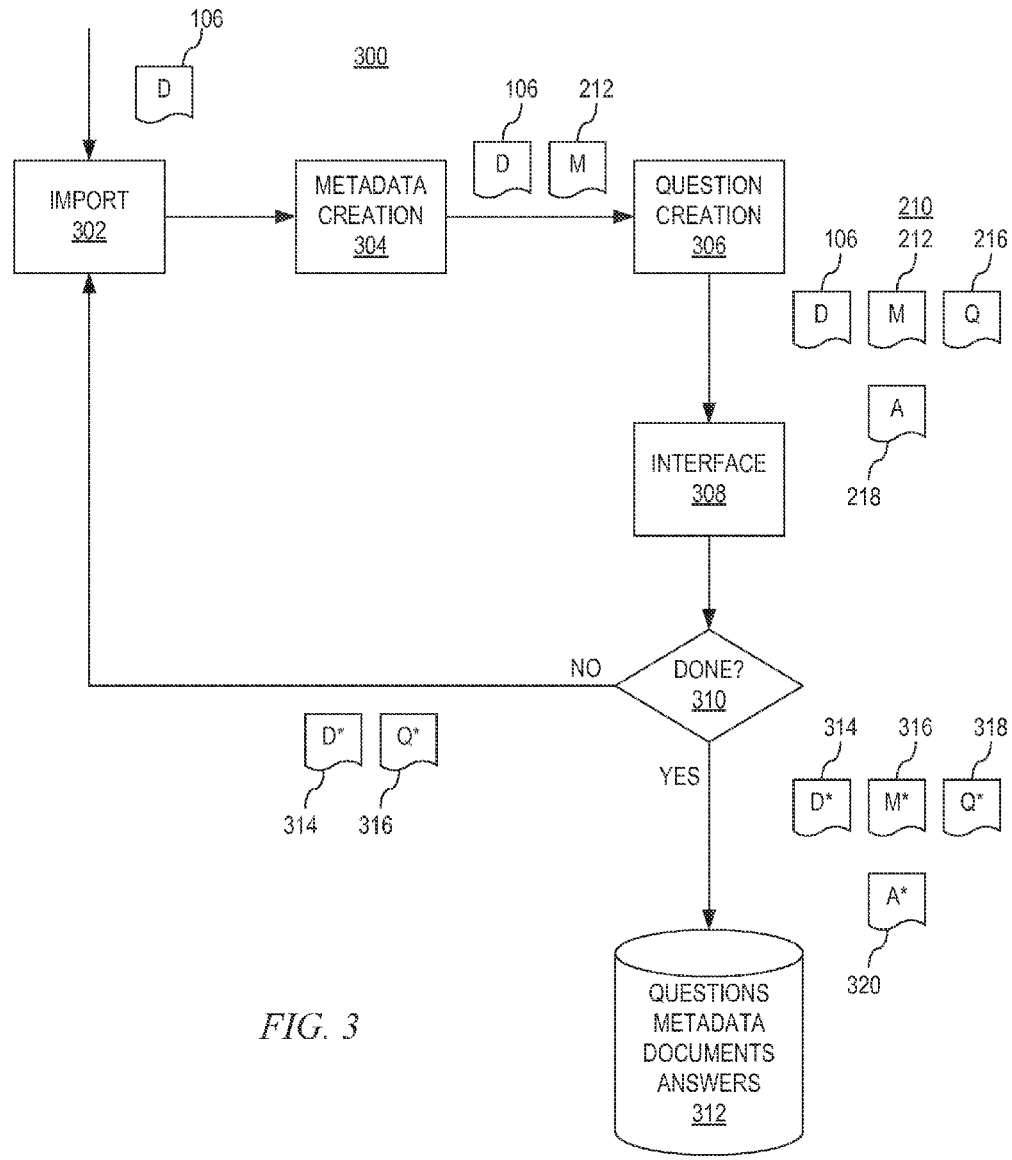
FIG. 3 depicts a flowchart diagram of one embodiment of a method for question/answer creation for a document.

FIG. 3 depicts a flowchart diagram of one embodiment of a method 300 for question/answer creation for a document 106. Although the method 300 is described in conjunction with the QA system 100 of FIG. 1, the method 300 may be used in conjunction with any type of QA system.

In one embodiment, the QA system 100 imports 302 one or more electronic documents 106 from a corpus 208 of data. This may include retrieving the documents 106 from an external source, such as a storage device in a local or remote computing device 104. The documents 106 may be processed so that the QA system 100 is able to interpret the content of each document 106. This may include parsing the content of the documents 106 to identify questions found in the documents 106 and other elements of the content, such as in the metadata associated with the documents 106, questions listed in the content of the documents 106, or the like. The system 100 may parse documents using document markup to identify questions. For example, if documents are in extensible markup language (XML) format, portions of the documents could have XML question tags. In such an embodiment, an XML parser may be used to find appropriate document parts. In another embodiment, the documents are parsed using native language processing (NLP) techniques to find questions. For example, the NLP techniques may include finding sentence boundaries and looking at sentences that end with a question mark or other methods. The QA system 100 may use language processing techniques to parse the documents 106 into sentences and phrases, for example.

In one embodiment, the content creator creates 304 metadata 212 for a document 106, which may contain information related to the document 106, such as file information, search tags, questions created by the content creator, and other information. In some embodiments, metadata 212 may already be stored in the document 106, and the metadata 212 may be modified according to the operations performed by the QA system 100. Because the metadata 212 is stored with the document content, the questions created by the content creator may be searchable via a search engine configured to perform searches on the corpus 208 of data, even though the metadata 212 may not be visible when the document 106 is opened by a content user. Thus, the metadata 212 may include any number of questions that are answered by the content without cluttering the document 106.

The content creator may create 306 more questions based on the content, if applicable. The QA system 100 also generates candidate questions 216 based on the content that may not have been entered by the content creator. The candidate questions 216 may be created using language processing techniques designed to interpret the content of the document 106 and generate the candidate questions 216 so that the candidate questions 216 may be formed using natural language.

When the QA system 100 creates the candidate questions 216 or when the content creator enters questions into the document 106, the QA system 100 may also locate the questions in the content and answer the questions using language processing techniques. In one embodiment, this process includes listing the questions and candidate questions 216 for which the QA system 100 is able to locate answers 218 in the metadata 212. The QA system 100 may also check the corpus 208 of data or another corpus 208 for comparing the questions and candidate questions 216 to other content, which may allow the QA system 100 to determine better ways to form the questions or answers 218. Examples of providing answers to questions from a corpus are described in U.S. Patent Application Publication No. 2009/0287678 and U.S. Patent Application Publication No. 2009/0292687, which are herein incorporated by reference in their entirety.

The questions, candidate questions 216, and answers 218 may then be presented 308 on an interface to the content creator for verification. In some embodiments, the document text and metadata 212 may also be presented for verification. The interface may be configured to receive a manual input from the content creator for user verification of the questions, candidate questions 216, and answers 218. For example, the content creator may look at the list of questions and answers 218 placed in the metadata 212 by the QA system 100 to verify that the questions are paired with the appropriate answers 218, and that the question-answer pairs are found in the content of the document 106. The content creator may also verify that the list of candidate questions 216 and answers 218 placed in the metadata 212 by the QA system 100 are correctly paired, and that the candidate question-answer pairs are found in the content of the document 106. The content creator may also analyze the questions or candidate questions 216 to verify correct punctuation, grammar, terminology, and other characteristics to improve the questions or candidate questions 216 for searching and/or viewing by the content users. In one embodiment, the content creator may revise poorly worded or inaccurate questions and candidate questions 216 or content by adding terms, adding explicit questions or question templates that the content answers 218, adding explicit questions or question templates that the content does not answer, or other revisions. Question templates may be useful in allowing the content creator to create questions for various topics using the same basic format, which may allow for uniformity among the different content. Adding questions that the content does not answer to the document 106 may improve the search accuracy of the QA system 100 by eliminating content from the search results that is not applicable to a specific search.

After the content creator has revised the content, questions, candidate questions 216, and answers 218, the QA system 100 may determine 310 if the content finished being processed. If the QA system 100 determines that the content is finished being processed, the QA system 100 may then store 312 the verified document 314, verified questions 316, verified metadata 318, and verified answers 320 in a data store on which the corpus 208 of data is stored. If the QA system 100 determines that the content is not finished being processed—for example if the QA system 100 determines that additional questions may be used—the QA system 100 may perform some or all of the steps again. In one embodiment, the QA system 100 uses the verified document and/or the verified questions to create new metadata 212. Thus, the content creator or QA system 100 may create additional questions or candidate questions 216, respectively. In one embodiment, the QA system 100 is configured to receive feedback from content users. When the QA system 100 receives feedback from content users, the QA system 100 may report the feedback to the content creator, and the content creator may generate new questions or revise the current questions based on the feedback.

FIG. 4 depicts a flowchart diagram of one embodiment of a method 400 for question/answer creation for a document 106. Although the method 400 is described in conjunction with the QA system 100 of FIG. 1, the method 400 may be used in conjunction with any QA system.

The QA system 100 imports 405 a document 106 having a set of questions 210 based on the content of the document 106. The content may be any content, for example content directed to answering questions about a particular topic or a range of topics. In one embodiment, the content creator lists and categorizes the set of questions 210 at the top of the content or in some other location of the document 106. The categorization may be based on the content of the questions, the style of the questions, or any other categorization technique and may categorize the content based on various established categories such as the role, type of information, tasks described, and the like. The set of questions 210 may be obtained by scanning the viewable content 214 of the document 106 or metadata 212 associated with the document 106. The set of questions 210 may be created by the content creator when the content is created. In one embodiment, the QA system 100 automatically creates 410 at least one suggested or candidate question 216 based on the content in the document 106. The candidate question 216 may be a question that the content creator did not contemplate. The candidate question 216 may be created by processing the content using language processing techniques to parse and interpret the content. The system 100 may detect a pattern in the content of the document 106 that is common for other content in the corpus 208 to which the document 106 belongs, and may create the candidate question 216 based on the pattern.

The QA system 100 also automatically generates 415 answers 218 for the set of questions 210 and the candidate question 216 using the content in the document 106. The QA system 100 may generate the answers 218 for the set of questions 210 and the candidate question 216 at any time after creating the questions and candidate question 216. In some embodiments, the answers 218 for the set of questions 210 may be generated during a different operation than the answer for the candidate question 216. In other embodiments, the answers 218 for both the set of questions 210 and the candidate question 216 may be generated in the same operation.

The QA system 100 then presents 420 the set of questions 210, the candidate question 216, and the answers 218 for the set of questions 210 and the candidate question 216 to the content creator for user verification of accuracy. In one embodiment, the content creator also verifies the questions and candidate questions 216 for applicability to the content of the document 106. The content creator may verify that the content actually contains the information contained in the questions, candidate question 216, and respective answers 218. The content creator may also verify that the answers 218 for the corresponding questions and candidate question 216 contain accurate information. The content creator may also verify that any data in the document 106 or generated by the QA system 100 in conjunction with the QA system 100 is worded properly.

A verified set of questions 220 may then be stored 425 in the document 106. The verified set of questions 220 may include at least one verified question from the set of questions 210 and the candidate question 216. The QA system 100 populates the verified set of questions 220 with questions from the set of questions 210 and candidate questions 216 that are determined by the content creator to be accurate. In one embodiment, any of the questions, candidate questions 216, answers 218, and content that is verified by the content creator is stored in the document 106, for example, in a data store of a database.

Thus, using the mechanisms described above, or equivalent mechanisms in other QA systems generally known in the art, a system is developed, and a corpus of content is created, that can be used to generate answers to natural language questions posed to the QA system. The QA system may comprise multiple engines or modules comprising logic for performing various operations for processing an input question in a natural language, searching a corpus of information for generating candidate answers to the input question, ranking or scoring the candidate answers, and performing a final merging of the scored or ranked candidate answers to generate a single ultimate answer to the input question. Thus, the QA system may comprise engines/modules for performing question analysis, content analysis of documents in a corpus of information, primary search, candidate answer generation, candidate answer scoring/ranking, and final merging of candidate answers.

The illustrative embodiments of the present invention augment the QA system described in FIGS. 1-4 above, or similar QA system that utilizes rankings of candidate answers for selecting a final answer to an input question, by replacing a single ranker based mechanism with a QA system that utilizes an array of rankers to provide a more accurate final answer to input questions and further provides a training methodology for training an array of rankers and selecting an array of rankers to be used during runtime operation of the QA system. This improves the operation of a QA system both with regard to a specific domain or area of knowledge and with regard to multiple domains or areas of knowledge such that a more open-domain QA system may be provided.

Figure 5:
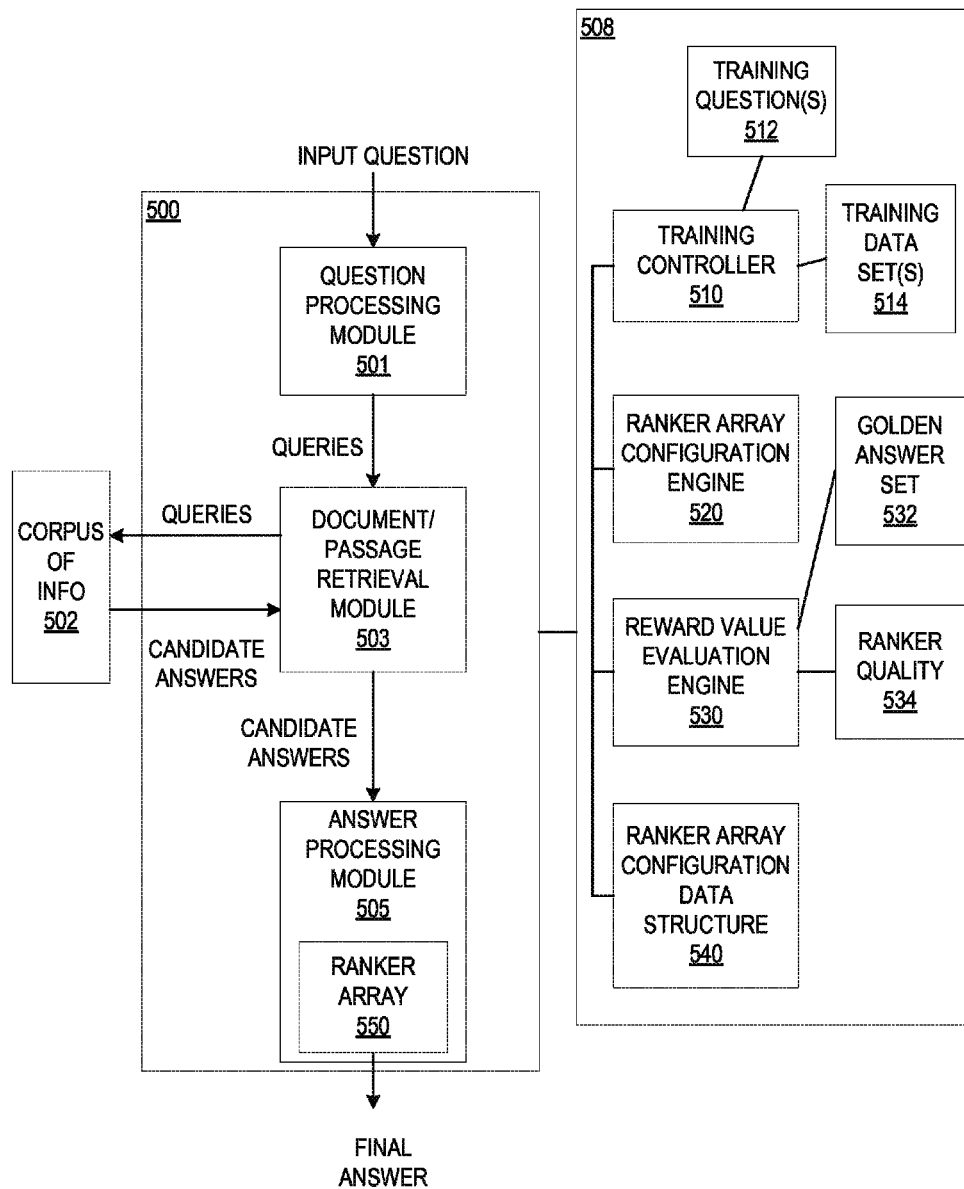
FIG. 5 is an example block diagram illustrating the primary operational elements of a QA system implementing the mechanisms of the illustrative embodiments.

FIG. 5 is an example block diagram illustrating the primary operational elements of a QA system implementing the mechanisms of the illustrative embodiments. As shown in FIG. 5, a QA system 500 includes a question processing module 501, a document/passage retrieval module 503, and an answer processing module 505, which in accordance with the illustrative embodiments herein, includes a ranker array 550 rather than a single ranker. For a natural language question raised by a user, or as part of a training of the QA system 500, question parsing and focus detecting are performed in the question processing module 501, which generates queries for the question. That is, the question processing module 501 parses the input question to identify the portions of the question, the types of information being requested in the information by classifying the words in the question according to the known type of information being requested, e.g., a name, address, date, time, title, event, product, object, etc. From this information query statements may be generated that can be applied against a database comprising the data for documents, passages, or portions of text of a corpus of information.

During runtime, the input question may be received from a user via the user's client computing device and one or more data networks, for example. During training, a predetermined set of training questions 512 may be established, for which the correct answers from a training data set 514, representing the corpus of information for training purposes, are known and are stored as the golden answer set 532.

The document/passage retrieval module 503 applies the queries to a corpus of information 502, such as a database of structure and/or unstructured document data, and performs document filtering and passage post-filtering in a document containing the content, e.g., keywords matching criteria of one or more of the queries, so as to generate candidate answers. The corpus of information 502, during runtime may be a complete corpus of information 502 intended to be used for answering questions input by users. The corpus of information 502, during training, may be one or more training data sets, such as training data set(s) 514, which may be relatively smaller data sets than the set of data 502 used during runtime operation. The training data set(s) may be conditioned so as to enable training of the QA system 500 using known answers, i.e. the golden answer set 532, to known training questions 512. That is, since the answer to the training question 512 is known a priori, the results generated by the QA system 500 may be compared to the known answer 512 by the training system 508 to determine the correctness of the operation of the QA system 500 and tune or train it accordingly to improve the probability that the QA system 500 will operate to generate the correct final answer to an input question.

The answer processing module 505 of the QA system 500 performs candidate identification and answer ranking on the candidate answers generated by the document/passage retrieval module 503, and finally formulates an answer to the raised natural language question, so as to output a brief answer to the user in natural language. In general, the answer processing module 505 evaluates the evidence obtained from analyzing the corpus of information 502, 514 in relation to the candidate answers to generate a confidence score for the candidate answer. The confidence score may be determined by applying a logistic regression model to the particular test question. This logistic regression is trained on a set of training questions sets, with the correct answer specified. During training, a proposed answer to a question is compared to the correct answer, and a truth value of 1 (the answer is correct) or 0 (if the answer is incorrect) is assigned. During the test and production phase, the trained model is applied, and a numeric value between 0 and 1 is received from the trained model which is the confidence value produced by the model.

As mentioned above, in known QA systems, the answer processing module 505 utilize a single ranker to determine the ranking of candidate answers. The ranker is a module of logic that implements one or more statistical classification functions for evaluating characteristics, also referred to as "features" in the QA system nomenclature, of portions of text with regard to the correctness of candidate answers to generate a measure of confidence that the candidate answer is a correct answer for an input question. The confidence measures themselves may be generated using an elaborate framework for ranking candidate answers. This elaborate framework may involve, for example, (1) a candidate answer merging phase where answers that are deemed to be equivalent are merged by having the question and answer system select a most complete form of the answer; (2) a feature merging phase in which the question and answer system performs operations to make sure that the same answer returned from different searches do not have duplicate features, thereby resulting in a features vector where each feature has only one value; (3) a final merger phase in which machine learning predictive models are used to perform more elaborate answer merging; and (4) a ranking phase in which the remaining candidate answers are ranked according to their evidence scores (determined by a plethora of scorer annotators) and a final judgment of the likelihood that a particular candidate answer is the correct final answer is made. The actual scoring, or confidence measures, are generated based on supporting evidence identified by the question and answer system which formulates a hypothesis (candidate answer), performs a search for evidence in support of the hypothesis, and generates a score for the hypothesis based on a direct correlation of the quality of the supporting evidence that is found in the corpus of information processed. More information about scoring and confidence measure generating mechanisms that may be used with a question and answer system may be found, for example, in the IBM Journal of Research and Development, 2012, Volume 56, Issue 3.4, which is hereby incorporated in its entirety by reference.

With the illustrative embodiments, an array of rankers, or ranker array 550, having a plurality of rankers is utilized to generate a plurality of ranked lists of candidate answers from which a final answer may be selected during runtime. During training operations, the ranker array 550 may operate on the candidate answers generated by the document/passage retrieval module 503 based on training questions 512 input to the QA system 500 via the training controller 510 and the training data set(s) 514 used as the corpus of information upon which the QA system 500 operates during training. The results of the ranker array 550 may be analyzed by the training system 508 mechanisms of the illustrative embodiments to modify the ranker array 550 to improve the quality of the results generated by the ranker array 550 using reward value calculations and evaluation as described hereafter.

In accordance with the illustrative embodiments, during training, the training system 508 operates in conjunction with the QA system 500 to train the QA system 500 via a continuous iterative methodology to modify the operation of the QA system 500 to improve the quality of the results generated by the QA system 500. With specific importance to the illustrative embodiments described herein, the training may be used to improve the ranking of candidate answers by the answer processing module 505, and in particular the ranker array 550, to improve the likelihood that the QA system 500 will rank the candidate answers correctly and thereby have a higher probability of generating a correct final result.

The training system 508 includes a training controller 510 that controls the overall operation of the training system 508 and orchestrates the operation of the other elements of the training system 508. The training controller 510 may receive as input a set of input training questions 512 along with the actual training data set(s) 514 representing the data for a training corpus of information, i.e. set of documents, passages, portions of text, or the like. The training data set(s) may have been augmented with metadata representing the questions answered by the documents, passages, portions of text, or the like, the corresponding answers, and the other information regarding the structure or content of the text in the manner previously described above with regard to FIGS. 1-4, for example.

The training controller 510 may control the other elements of the training system 508 to implement their operations for establishing a ranker array 550, evaluating the results generated by the ranker array 550, modifying the ranker array 550 based on the evaluation of the results generated by the ranker array 550, and storing ranker array configuration information for later use during runtime operation of the QA system 500.

The ranker array configuration engine 520 selects, for a particular training iteration or set of training iterations, one or more types of rankers and a particular number of each type of ranker to include in the ranker array 550. Again, a "type" of ranker is defined by the one or more statistical classification functions used by the ranker, where the statistical classification function evaluates different characteristics or features of text in the corpus of information to determine the correctness of a candidate answer. Thus, if a ranker looks at certain medical terminologies, then it may be a ranker of a "medical" type. If a ranker looks at certain financial terminologies, then it may be a ranker of the "financial" type. The types may be of various granularities including, for example, "medical", "lung cancer", "mutations," etc., and may be for specific domains or areas of knowledge. The ranker array configuration engine 520 may select the particular combination of types of rankers and numbers of each type of ranker empirically over a number of iterations of the training of the QA system 500. The ranker array configuration engine 520 may store information about previous selections of ranker array configuration, i.e. types and numbers of each type of ranker, to assist in selecting a ranker array for training of the QA system 500.

Having selected a ranker array 550, the training controller 510 may submit training questions 512 to the QA system 500 along with the training data set(s) 514. The question processing module 501 processes the training questions 512 to generate queries which are applied by the document/passage retrieval module 503 to the training data set(s) 514 to generate candidate answers that are processed by the answer processing module 505 to generate confidence measures and rankings of candidate answers using the ranker array 550. Each ranker in the ranker array 550 will generate its own ranked listing of candidate answers based on the evaluations performed by the ranker with regard to the particular statistical classification function(s) it implements and the resulting ranked listings of candidate answers are then evaluated by the reward value evaluation engine 530 using the golden answer set 532 (specifying the correct answers for the training question(s) 512) and the ranker quality values 534 for the particular rankers in the ranker array 550, as will be described in greater detail hereafter.

The reward value evaluation engine 530 may generate a reward value for each of the rankers and for the ranker array 550 as a whole. The reward value generated for the ranker array 550 as a whole may be used to determine if the ranker array 550 achieves an acceptable threshold reward value indicative of an acceptable operation of the ranker array 550. If so, then the ranker array 550 configuration may be stored in the ranker array configuration data structure 540 for later retrieval and use during runtime operations to configure the ranker array 550 for the QA system 500. For example, the ranker array 550 configuration may be associated with a particular domain or area of knowledge associated with the training question 512 for which the training was performed. Thus, when another input question is received by the QA system 500 and the QA system 500 determines that the input question is directed to a domain or area of knowledge for which there is a ranker array 550 configuration defined in the ranker array configuration data structure 540, then that configuration may be implemented by the answer processing module 505 when processing the input question. In this way, dynamic modification of the ranker array 550 may be made possible for runtime operation of the QA system 500.

The reward values generated by the reward value evaluation engine 530 for each of the rankers in the ranker array 550 may be used to identify which rankers within the ranker array 550 are producing better results than others. Those rankers that are not producing better results may have their configurations adjusted so as to try and improve the overall operation of the ranker array 550. Such configuration adjustments may involve modifying attributes or parameters of the rankers, replacing the rankers with a different type of ranker, adjusting a sampling of the training data set(s) 514 upon which the ranker operates to evaluate the candidate answer, or the like. The ranker array 550 may then be applied to the candidate answers again to determine if the result of the ranker adjustments improves the reward value for the corresponding ranker and/or improves the overall reward value for the ranker array 550. If so, then the ranker adjustments may be maintained. If not, additional ranker adjustments may be implemented in an iterative manner.

It should be appreciated that the training of the ranker array 550 may involve performing multiple iterations of training with regard to the same or different training questions 512 using different samplings of the training data set(s) 514. That is, during a first iteration, a first sampling of the training data set(s) 514 may be used for a particular ranker (with other rankers in the ranker array 550 possibly using different samplings of the same training data set(s) 514), and this sampling may be adjusted during subsequent iterations so as to attempt to improve the reward value associated with the ranker and/or the ranker array 550 as a whole. For example, in one illustrative embodiment, the re-sampling of the training data set(s) 514 may be performed with regard to the particular training question type or domain to which it pertains. Thus, only training data in the training data set(s) 514 having a type matching the identified type of the training question may be used in the re-sampling of the training data set(s) 514. In one illustrative embodiment, the reward value generated for a particular ranker in the ranker array 550 may be an average or other statistical measure of the reward values generated over multiple iterations so as to provide an average reward value for the ranker for different samplings of the training data set(s) 514.

Thus, with the mechanisms of the illustrative embodiments, multiple iterations of training may be applied to a particular ranker array 550 configuration to attempt to adjust the attributes or parameters used by the rankers in the ranker array 550, and/or the samplings of the training data set(s) 514, to achieve a ranker array 550 reward value that meets or exceeds a predetermined acceptable reward value threshold. If such can be achieved, then the corresponding ranker array configuration is stored in the ranker array configuration data structure 540 for future use. If such cannot be achieved after passing through each of the iterations of changes to attributes, parameters, and samplings of the training data set(s) 514, a different configuration of the ranker array 550 may be generated by the ranker array configuration engine 520, such as by selecting different types of rankers, different numbers of rankers, or a combination of different types and different numbers of rankers, and then repeating the iterative training process.

During the training process, when the reward value evaluation engine 530 is evaluating the reward values generated for the rankers and ranker array 550, the reward value evaluation engine 530 utilizes ranker quality values 534 for the particular rankers in the ranker array 550. These ranker quality values 534 are accumulated over multiple iterations of training and are based on how often and how closely the particular ranker selects the correct answer as specified in the golden answer set 532, for the particular training question. That is, the ranker's quality value is higher the more the ranker selects the correct answer as its highest ranked candidate answer. The rankers quality value is relatively higher when the ranker ranks the correct answer closer to the highest ranked candidate answer, e.g., if the ranker ranks the correct answer as rank 2 (rather than rank 1 which would mean that it was the correct answer), then that ranking is relatively better than a ranker that ranks the correct answer as rank 3, for example. Various levels of quality may be attributed to a ranker based on where in the ranked list of candidate answers the ranker ranked the correct answer. This may be accumulated over multiple iterations of training so as to achieve an accumulated, average, or other statistically generated quality value for the ranker.

As discussed above, the evaluation of the ranker array 550 is based on reward values generated for the rankers and the ranker array 550 as a whole. The reward values are calculated as a function of the quality value of the ranker and the correctness with which the ranker ranked the candidate answers. The particular function used to generate the reward value may be different for different implementations of the illustrative embodiments. In generating the reward value, various data structures may be used to generate the reward values including the golden answer set 532 which provides, for each input training question, a corresponding truth table specifying the candidate answers and a corresponding truth value indicative of whether the candidate answer is correct or not, ranker quality value data structure 534 specifying the ranker quality values for the rankers in the ranker array 550, and the ranked listings of candidate answers generated by each of the rankers in the ranker array 550.

FIG. 6 is an example diagram illustrating an example set of data structures used to generate a reward value in accordance with one illustrative embodiment. In the example shown in FIG. 6, it is assumed that a particular input training question has been input to the QA system 500 which has been parsed and processed to generate queries that are applied to a training data set 514 to generate a set of candidate answers 1-5. These candidate answers 1-5 are then provided to a ranker array 550 which evaluates each of the candidate answers 1-5 within the context of the training data set 514, applying their various statistical classification functions to the evidence from various samplings of the training data set 514 used by the various rankers, to generate a ranked listing of candidate answers ranked according to the rankers' generation of confidence measures for each of the candidate answers. That is, for each candidate answer 1-5, the ranker generates a confidence measure value which may then be compared to the confidence measure values of each of the other candidate answers so that the candidate answers may be ordered from a highest confidence measure value to a lowest confidence measure value, the highest confidence measure value having a highest ranking in the listing and the lowest confidence measure value having a lowest ranking in the listing.

Thus, as shown in FIG. 6, one or more data structures 612-616 (which are shown together in FIG. 6 as table data structure 610) representing the ranked listing of candidate answers for each of the rankers (ranker 1 to ranker 3) are generated by the rankers of the ranker array 550. In the depicted example, ranker 1, based on its individual application of its statistical classification function(s) to the training data set 514 for the candidate answers and the resulting confidence measures generated, ranks candidate answer 1 as the highest ranked candidate answer indicating that ranker 1 believes that candidate answer 1 is the correct answer for the input training question. Rankers 2 and 3 rank candidate answer 2 as the highest ranked candidate answer indicating that they both believe candidate answer 2 to be the correct answer for the input training question.

The truth table 620 is provided for the particular input training question as part of the golden answer set 532 and comprises entries for each of the candidate answers and a logical value indicative of whether the candidate answer is the correct answer or not for the input training question. In the depicted example, if the candidate answer is the correct answer for the input training question, the logical value is 0 and if the candidate answer is not the correct answer for the input training question, the logical value is 1. It should be appreciated that in some instances there may be more than one correct answer. For example, the answers "Carter", "Jimmy Carter", and "President Carter" may all be correct answers for the question "Who was the 39$^{th}$ President of the United States?" Similarly, the values 5%, 0.05, and "5 percent" may all be correct answers for a particular question. Thus, the truth table 620 comprises a listing of the possible candidate answers and which ones are correct answers and which ones are not, with the possibility of multiple candidate answers being correct. Moreover, the truth table 620 may take advantage of regular expression wild cards and number normalization.

By comparing the truth table 620 to the ranked listings of candidate answers 612-616, it can be determined where in each ranked listing of candidate answers 612-616 the correct answer for the input training question was ranked by a particular ranker 1-3. As a result, the system can determine the quality of the results generated by the corresponding ranker 1-3 based on how high in the ranked listing 612-616 the particular ranker ranked the correct answer. This comparison may be used to adjust a quality value assigned to the ranker in the quality value data structure 630. The quality value may be accumulated, averaged, or otherwise statistically calculated over multiple iterations of training for the particular ranker.

Thus, for example, in the depicted example the correct answer for the input training question is candidate answer 2 as identified by the logical 0 value in the truth table 620. Ranker 1 selected candidate answer 2 to be the second highest ranked candidate answer, whereas rankers 2 and 3 selected candidate answer 2 to be the first ranked candidate answer, as shown in ranked listing data structures 612-616. Thus, rankers 2 and 3 would be given a highest quality value since they both selected the correct answer as the highest ranked candidate answer and ranker 1 would be given a relatively lower quality value since ranker 1 selected candidate answer 2 to be a lower ranked candidate answer in its corresponding ranked listing 612. If other rankers were involved that ranked the correct answer at lower ranks than ranker 1, then those rankers would be given a relatively lower quality value than ranker 1, and so on. In this way, various levels of quality may be assigned to rankers based on the ranks they give to the correct answers during each iteration of the training operation.

For purposes of the depicted example, it is assumed that ranker 2 has previously performed with higher quality than ranker 3 and thus, while for this training iteration both ranker 2 and ranker 3 would have a same quality value assigned to them, when accumulating, averaging, or otherwise statistically combining the quality value for the current iteration with previous iterations, ranker 2 is determined to have a higher quality than ranker 3 and thus, ranker 2 is given a larger quality value of 3 whereas ranker 2 is given a relatively lower quality value of 2 in the quality value data structure 630. Ranker 1 is given the lowest quality value of the three rankers and is assigned a quality value of 1 in the depicted example.

It should be appreciated that while the depicted example illustrates the use of the logical value 0 for correct candidate answers, 1 for incorrect candidate answers, and the use of positive integer values for both the ranks and the quality values in the data structures 612-616, 620, and 630 of FIG. 6, the illustrative embodiments are not limited to such. Rather, any suitable values for indicating correctness/incorrectness of candidate answers, relative rankings, and relative qualities of rankers may be used without departing from the spirit and scope of the illustrative embodiments.

From the values shown in the data structures 612-616, 620, and 630, the reward value evaluation engine 530 generates reward values for the various rankers and the ranker array as a whole. The calculation of reward values may take many different forms depending upon the particular implementation of the illustrative embodiments. The following description will provide two examples of implementations of the illustrative embodiments for calculating reward values however, it should be appreciated that the illustrative embodiments are not limited to these particular implementations. Other combinations of candidate answer correctness, ranker quality values, answer ranking, and other values indicative of the correctness or quality of the operation of a ranker may be used without departing from the spirit and scope of the illustrative embodiments.

In one implementation of an illustrative embodiment, a cumulative reward value is generated based on the assumption that the training question data structure 512 comprises Q questions indexed by the value q, where A_q denotes the number of candidate answers for question q. The value $g_{mqa}$ is used to represent the correctness of a corresponding candidate answer a in the set of candidate answers A_q for question q. The value $r_{qma}$ indicates a rank of answer a for the question q listed by ranker m, where M is the total number of rankers. The value C_m represents the quality value of the ranker m.

Using these values, in one implementation of the illustrative embodiments, the cumulative reward value for the ranker array 550 may be calculated using the following relationship:

$$Reward = \sum_{m=1}^{M} C_m \left[ \sum_{q=1}^{Q} \sum_{a=1}^{A_q} \left( \frac{g_{mqa}}{2^{r_{mqa}}} \right) \right]$$

Essentially, the ratio of the correctness value $q_{mqa}$ to $2^{\char`\^}r_{mqa}$ is summed over all of the candidate answers a from 1 to $A_q$ for question q, and over all of the questions q from 1 to Q, and multiplied by the quality of the ranker $C_m$. This gives a reward value for the individual ranker m. These reward values may then be accumulated over all of the rankers m from 1 to M to give a reward value for the ranker array 550.

As can be seen from the above relationship, the reward value is proportional to the quality of the ranker $C_m$ and the correctness of the candidate answers $g_{mqa}$. Thus, rankers using better classifiers, i.e. statistical classification functions, and thus having relatively higher quality values and correctness values, contribute more to the overall reward value. Wrong answers do not contribute to the reward value because the gain for the wrong answer is given a correctness value of zero. The reward value is inversely proportional to the rank of the correct answer within the ranked listing for the particular ranker m. The power of two in the denominator of the ratio ensures the diminishing contribution of lower rank candidate answers to the reward value.

The following relationship illustrates another possible implementation of the illustrative embodiments when generating a reward value for the ranker array 550:

$$Reward = \frac{\sum_{n=1}^{N} g(R_n)}{\sum_{n=1}^{N} k(1 * f(R_n))}$$

In this implementation, $R_n$ represents a ranker n in a ranker array having rankers 1 to N. The value $g(R_n)$ is a correctness value that measures whether the particular ranker correctly selected the correct candidate answer as the highest ranked candidate answer in its ranked listing of candidate answers. Thus, the value $g(R_n)$ is set to 1 if the ranker identifies the correct answer as its highest ranked candidate answer in its corresponding ranked list of candidate answers, and is set to 0 if the ranker $R_n$ identifies an incorrect candidate answer as being the highest ranked candidate answer in its ranked listing of candidate answers. The function $f(R_n)$ denotes a weighted quality value of the ranker n. In one illustrative embodiment, the function $f(R_n)$ may have a range of values from 0 to 2. This range may be used so as to keep the weight relatively small, but in other illustrative embodiments the function $f(R_n)$ may have different ranges depending upon the particular implementation desired. This range may be categorized into brackets based on the quality of the individual ranker, such that a set of rankers for a group will have a consistent weight. For example, several rankers that rank candidate answers based on the type of tumor mutation and sub-mutation type may have the same weight level based on the number of classification features that they rely upon.

Thus, looking and the above relationship, one can see that the reward value in this implementation is essentially the ratio of the sum of the correctness values of the rankers to the sum of the quantity 1*the weighted quality of the rankers. This relationship is a simplified version of the relationship of the quality and correctness of the rankers as a weighted ration. The previous relationship in the previously described embodiment takes into account the number of questions, the number of candidate answers, and the like, and is more likely to provide more accurate indications of quality depending on the type of classifiers of the rankers, the number of training questions used, and the number of candidate answers evaluated.

Regardless of the particular implementation of the reward value calculation utilized by the illustrative embodiments, the reward value evaluation engine 530 in FIG. 5 comprises the logic for generating such reward values and evaluating them against one or more reward value thresholds to determine if the individual rankers and/or the ranker array 550 as a whole is operating at an acceptable level. The reward value evaluation engine 530 may calculate the reward values for the individual rankers and the ranker array 550, such as by using relationships as described above, or other relationships that may be apparent to those of ordinary skill in the art in view of the present description, and then compare them to the predetermined reward value thresholds to determine if modifications to the rankers in the ranker array 550 should be performed to improve the operation of the ranker array 550.

For example, the reward value evaluation engine 530 may evaluate the overall reward value of the ranker array 550 to determine if an acceptable reward value threshold has been met or exceeded by the reward value for the ranker array 550. If so, then the ranker array configuration, e.g., the listing of types of rankers, numbers of each type of ranker, configuration parameters of each ranker, and the like, may be stored in the ranker array configuration data structure 540 for later use during runtime operations of the QA system 500. This configuration information may be stored in association with information about the domain(s) or area(s) of knowledge of the input training question(s) with which the particular ranker array 550 was determined to have acceptable performance. Thus, if the training questions were directed to a subset of domain(s) or area(s) of knowledge, then this information may be stored in association with the ranker array configuration to allow a plurality of different ranker array configurations to be stored for a plurality of different domains and areas of knowledge.

If the reward value associated with the ranker array 550 as a whole does not meet or exceed the predetermined acceptable reward value threshold, then individual reward values for individual rankers may be evaluated against one or more individual acceptable reward value thresholds to determine which rankers are performing acceptably and which are not. Those that are not may have their configurations modified by the ranker array configuration engine 520, either by modifying a sampling of the training data set 514 used by the ranker, modifying configuration parameters of the ranker, replacing the ranker with another ranker of the same or different type, or the like. This modification of the rankers in the ranker array 550 may be performed iteratively for each set of training questions 512 until such time as the ranker array 550 achieves the acceptable reward value threshold or better, or until a stopping condition for the iterative training of the ranker array 550 is encountered, e.g., a predetermined number of iterations, all predefined configurations of the ranker array 550 have been evaluated, or the like.

Thus, the illustrative embodiments provide mechanisms for training an array of rankers for use with a QA system 500 to provide higher quality results with regard to selecting candidate answers for output as the correct answer for an input question. The illustrative embodiments utilize a continuous iterative approach and reward value calculation based on the correctness of selected candidate answers and the identified quality value of the operation of the individual rankers in the ranker array. The reward value calculation is based on the rankings of the candidate answers generated by the individual rankers and is not based directly on the confidence measures of the rankers, thereby allowing a heterogeneous array of rankers to be utilized.

In addition to training the ranker array, the illustrative embodiments may make use of the trained ranker array during runtime to provide more accurate answers to input questions. That is, during runtime operation, the input question to the QA system 500 may be received from a client computing device, application, service, or the like, and may be processed by the question processing module 501 and document/passage retrieval module 503 in the manner previously described. In addition, as part of the question processing, the question processing module 501 may determine a domain to which the input question pertains. This information may be communicated to the answer processing module 505 which may utilize this domain identification to select a corresponding ranker array configuration from the ranker array configuration data structure 540 and then configure the ranker array 550 according to the selected ranker array configuration. In this way, the ranker array 550 may be dynamically configured for the particular domain of the input question during runtime operation. Alternatively, the ranker array 550 may not be dynamically modified and may be the same for each domain of input questions but may be trained in accordance with the mechanisms previously described.

In either case, whether dynamically configured or statically configured, the answer processing module 505 receives the candidate answers from the document/passage retrieval module 503 and utilizes the rankers in the ranker array 550 to generate a plurality of ranked listings of candidate answers. The answer processing module 505 may then perform a merge operation to merge the ranked listing of candidate answers into a single ranked listing of candidate answers and, ultimately, a highest ranked candidate answer may be selected as the correct answer for the input question. The merging of the ranked listings of candidate answers may take many different forms depending upon the particular implementations desired. For example, a majority consensus approach may be utilized to select a relative ranking for a candidate answer based on the majority of rankings for that candidate answer across all of the ranked listings of the rankers. Thus, for example, if the majority of rankers indicate candidate answer 2 to be the highest ranked candidate answer, then candidate answer 2 is selected to be the highest ranked candidate answer in the final ranked listing generated by the answer processing module 505.

As mentioned above, the illustrative embodiments provide an iterative approach to reward-based ranker array training and configuration. The reward value is used to identify the best performing combination of rankers and represents both the quality of the individual rankers and the rankings of the correct answers. This iterative approach to ranker array training and configuration essentially involves configuring the ranker array, applying the ranker array to candidate answers generated based on a training set of questions and training data set, generating ranked listings of the candidate answers, comparing the ranked listings of candidate answers to golden answer sets for the training questions to determine a correctness and quality of the rankers, generating a reward value for the rankers and ranker array based on the correctness and quality of the rankers, and then evaluating the reward value against a reward value threshold. This operation is outlined in the flowchart of FIG. 7.

Figure 7:
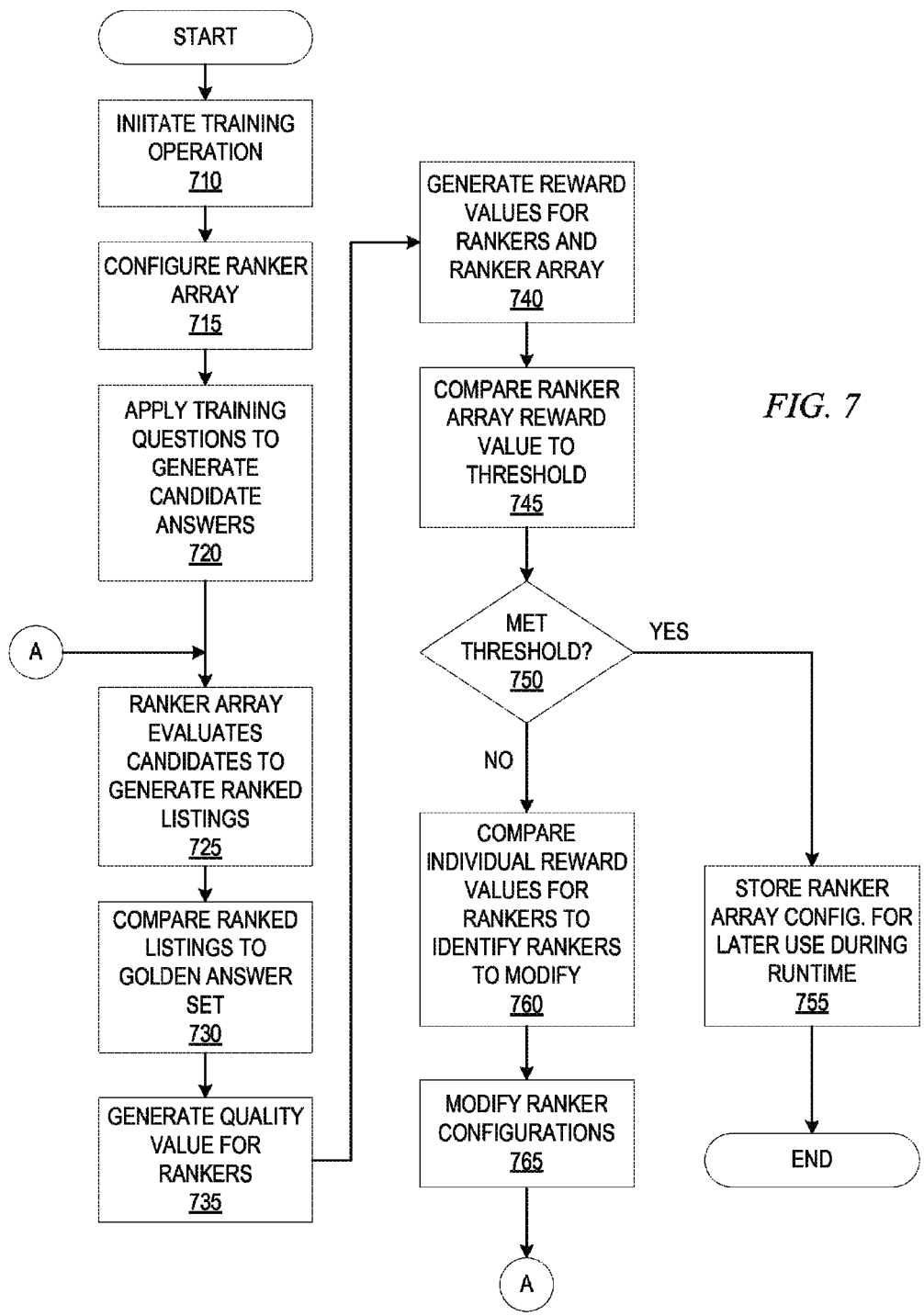
FIG. 7 is a flowchart outlining an operation for iteratively training and configuring a ranker array for a QA system in accordance with one illustrative embodiment.

FIG. 7 is a flowchart outlining an operation for iteratively training and configuring a ranker array for a QA system in accordance with one illustrative embodiment. The operation outlined in FIG. 7 may be implemented by a training system, such as training system 508 in FIG. 5, when training the ranker array for a QA system, such as QA system 500 in FIG. 5. As such, the operations outlined in FIG. 7 may be implemented, for example, as computer executable instructions stored in a memory, storage device, or other instruction storage mechanism which are then executed by one or more processors of the computing device. Alternatively, portions of, or all of, the operations outline din FIG. 7 may be implemented by hardware devices, such as Application Specific Integrated Circuit (ASICs), firmware, or the like.

As shown in FIG. 7, the operation starts by initiating a training operation with the input of a training question set and training data set (step 710). An initial ranker array configuration is selected and the ranker array of the QA system is configured according to the selected ranker array (step 715). The training questions are applied by the QA system to the training data set to generate a set of candidate answers (step 720). The candidate answers are evaluated by ranker array to generate a plurality of ranked listings of candidate answers (step 725). The ranked listings of candidate answers are compared to an input set of golden answers for the training question set to determine a correctness of the ranked listings of the candidate answers (step 730). A quality value for each of the rankers in the ranker array is calculated based on the comparison, and possibly previously calculated quality values for the rankers (step 735). The quality value and correctness of the ranked lists are used to generate reward values for the rankers and the ranker array as a whole (step 740).

The reward value for the ranker array is compared to a predetermined acceptable reward value (step 745) and a determination is made as to whether the ranker array is operating at an acceptable level based on the comparison (step 750). If the ranker array is operating at an acceptable level of correctness and quality as determined from the comparison of the reward value to the acceptable reward value threshold, then the ranker array configuration is stored for later use during runtime operations (step 755). If the ranker array is not operating at an acceptable level, then the individual ranker reward values may be compared against one or more individual ranker reward value thresholds to identify rankers requiring modification (step 760). Those rankers whose reward values do not satisfy the one or more individual ranker reward value thresholds may have their configurations modified, including possibly replacing the ranker as a whole, in an attempt to improve the performance of the ranker (step 765). The operation then iterates by returning to step 725.

Figure 8:
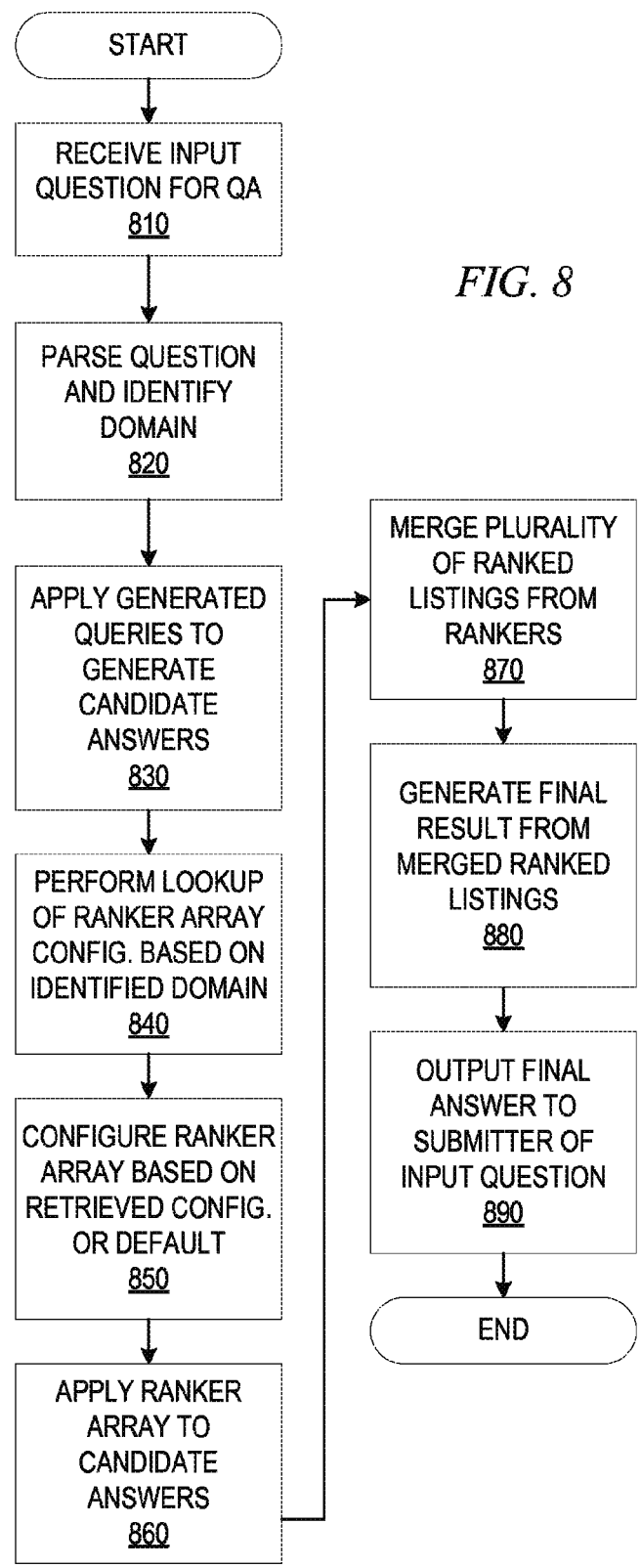
FIG. 8 is a flowchart outlining an operation of a QA system utilizing a ranker array in accordance with one illustrative embodiment.

FIG. 8 is a flowchart outlining an operation of a QA system utilizing a ranker array in accordance with one illustrative embodiment. The operations outlined in FIG. 8 may be implemented, for example, by a QA system, such as QA system 500 in FIG. 5, which has had its ranker array trained and configured in accordance with the mechanisms previously described. The QA system may be implemented in software, hardware, or a combination of software and hardware. For example, the QA system may be implemented as software instructions loaded into one or more memories and executed by one or more processors of one or more computing devices.

As shown in FIG. 8, the operation starts by receiving an input question from a client computing device (step 810). The input question is parsed and processed to identify characteristics of the input question including a type of domain or area of knowledge to which the input question pertains (step 820). One or more queries are generated based on the results of parsing and processing the input question and are applied against a corpus of information to identify candidate answers to the input question (step 830). In addition, the type of domain or area of knowledge may be used to dynamically configure the ranker array of the QA system for the particular domain or area of knowledge by looking up a ranker array configuration in a ranker array configuration storage system or data structure (step 840). The ranker array of the QA system is configured according to the retrieved ranker array configuration or a default configuration if one for the particular identified domain or area of knowledge cannot be found in the ranker array configuration storage system or data structure (step 850).

The configured ranker array is applied to the candidate answers generated by the QA system to generate a plurality of ranked listings of candidate answers (step 860). The ranked listings of candidate answers are then merged to generate a single ranked listing of candidate answers for the QA system (step 870) and a final answer result is generated based on the merged single ranked listing of candidate answers (step 880). The final answer result is output as the final answer for the input question and is returned in a message or other output data stream to the client computing device that submitted the input question (step 890). The operation then terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising a processor and a memory, for configuring a ranker array of a question and answer (QA) system, comprising:

generating, by the data processing system, an initial configuration of the ranker array of the QA system, wherein the ranker array comprises a plurality of rankers, and wherein each ranker in the ranker array applies a statistical classification function to candidate answers generated by the QA system in response to an input question to generate a ranked listing of candidate answers for the ranker;

inputting, by the data processing system, a training question to the QA system to generate a training candidate answer set;

applying, by the data processing system, the ranker array to the training candidate answer set to generate, for each ranker in the ranker array, a corresponding ranked listing of candidate answers in the training candidate answer set;

determining, by the data processing system, for each ranker in the ranker array, correctness of the corresponding ranked listing of candidate answers; and reconfiguring, by the data processing system, the ranker array based on results of the determined correctness of the corresponding ranked listing of candidate answers for each ranker in the ranker array, wherein the generating, inputting, applying, determining, and reconfiguring operations are performed iteratively over a plurality of training iterations, and wherein, for each training iteration in the plurality of training iterations, at least one of the training questions or a sampling of a corpus of data upon which the training questions or ranker array operates is different from other training iterations in the plurality of training iterations.

2. The method of claim 1, wherein reconfiguring the ranker array based on results of the determined correctness comprises:
generating a ranker array reward value for the ranker array based on the correctness of the corresponding ranked listing of candidate answers for each of the rankers in the ranker array;
comparing the ranker array reward value to a reward value threshold value; and
reconfiguring the ranker array in response to the ranker array reward value not satisfying a predetermined relationship with regard to the reward value threshold value.

3. The method of claim 2, wherein the ranker array reward value is generated based on a combination of the correctness of the corresponding ranked listing of candidate answers for each of the rankers in the ranker array and a quality value associated with each of the rankers in the ranker array.

4. The method of claim 2, wherein the quality value associated with a ranker in the ranker array is a quality value accumulated over a plurality of iterations of training of the ranker in the ranker array.

5. The method of claim 2, wherein generating a ranker array reward value comprises generating a ranker reward value for each ranker in the ranker array and generating the ranker array reward value based on a combination of the ranker reward values for each of the rankers in the ranker array.

6. The method of claim 5, wherein reconfiguring the ranker array comprises:
selecting one or more rankers in the ranker array to be reconfigured based on ranker reward values corresponding to the one or more rankers in the ranker array; and
reconfiguring the selected one or more rankers to generate a reconfigured ranker array.

7. The method of claim 2, wherein reconfiguring the ranker array comprises at least one of modifying a statistical classification function used by one or more of the rankers in the ranker array, or modifying a sampling of a corpus of information upon which one or more of the rankers in the ranker array operate.

8. The method of claim 2, further comprising:
in response to the ranker array reward value satisfying the predetermined relationship with regard to the reward value threshold value, storing ranker array configuration data specifying a configuration of the ranker array, in a ranker array configuration data structure.

9. The method of claim 8, wherein the ranker array configuration data is stored in the ranker array configuration data structure in association with an identifier of a domain of the training question.

10. The method of claim 1, wherein the ranker array comprises at least two rankers of different types, wherein each ranker of a particular type is configured for ranking candidate answers to input questions in a domain different from another ranker of a different type.

11. The method of claim 1, wherein the ranker array comprises a plurality of rankers of different types, and wherein each set of rankers of each type has a different number of rankers than a set of rankers of another type.

12. The method of claim 1, wherein determining, for each ranker in the ranker array, correctness of the corresponding ranked listing of candidate answers comprises:
receiving a golden answer set specifying one or more correct answers for the training question;
comparing the golden answer set to the corresponding ranked listing of candidate answers; and
generating a value indicative of correctness of the corresponding ranked listing of candidate answers based on results of the comparison of the golden answer set to the corresponding ranked listing of candidate answers.

13. The method of claim 2, wherein generating a ranker array reward value comprises utilizing the following relationship:

$$\text{Reward} = \sum_{m=1}^{M} C_m \left[ \sum_{q=1}^{Q} \sum_{a=1}^{A_q} \left( \frac{g_{mqa}}{2^{r_{mqa}}} \right) \right]$$

where Q is a number of training questions evaluated indexed by the value q, A_q denotes a number of candidate answers for a corresponding training question q, $g_{mqa}$ is a correctness value of a corresponding candidate answer a in a set of candidate answers A_q for training question q, $r_{qma}$ is a rank of answer a for the training question q listed by ranker m, where M is the total number of rankers, and C_m is a quality value of the ranker m.

14. The method of claim 1, further comprising:
receiving, after training of the ranker array, a runtime input question from a client computing device;
processing the runtime input question to generate one or more queries to be applied to a corpus of data;
applying the one or more queries to the corpus of data to generate a runtime listing of candidate answers;
processing, by the ranker array, the runtime listing of candidate answers to generate, for each ranker in the ranker array, a corresponding runtime ranked list of candidate answers, thereby constituting a plurality of runtime ranked lists of candidate answers; and
selecting a final answer for the runtime input question from the plurality of runtime ranked lists of candidate answers.

15. The method of claim 14, wherein selecting a final answer for the runtime input question from the plurality of runtime ranked lists of candidate answers comprises using a majority vote algorithm to select a candidate answer that a majority of the rankers in the ranker array indicate to be a most likely candidate answer for the runtime input question.

16. The method of claim 14, wherein the processing of the runtime input question further comprises identifying a domain of the runtime input question, and wherein the method further comprises:
performing a lookup operation in a ranker array configuration data structure based on the identified domain of the runtime input question to retrieve ranker array configuration data corresponding to the identified domain; and
configuring the ranker array according to the retrieved ranker array configuration data.

17. The method of claim 16, wherein the ranker array configuration data specifies at least one of one or more types of rankers to include in the ranker array or a number of each type of ranker to include in the ranker array.

18. A computer program product comprising a computer readable storage medium having a computer readable program stored therein, wherein the computer readable program, when executed on a computing device, causes the computing device to:
generate an initial configuration of a ranker array of the QA system, wherein the ranker array comprises a plurality of rankers, and wherein each ranker in the ranker array applies a statistical classification function to candidate answers generated by the QA system in response to an input question to generate a ranked listing of candidate answers for the ranker;

input a training question to the QA system to generate a training candidate answer set;

apply the ranker array to the training candidate answer set to generate, for each ranker in the ranker array, a corresponding ranked listing of candidate answers in the training candidate answer set;

determine, for each ranker in the ranker array, correctness of the corresponding ranked listing of candidate answers; and reconfigure the ranker array based on results of the determined correctness of the corresponding ranked listing of candidate answers for each ranker in the ranker array, wherein the computer readable program to generate, input, apply, determine, and reconfigure is performed iteratively over a plurality of training iterations, and wherein, for each training iteration in the plurality of training iterations, at least on of the training question or a sampling of a corpus of data upon which the training question or ranker array operates is different from other training iterations in the plurality of training iterations.

19. An apparatus, comprising:

a processor; and a memory coupled to the processor, wherein the memory comprises instructions which, when executed by the processor, cause the processor to:

generate an initial configuration of a ranker array of the QA system, wherein the ranker array comprises a plurality of rankers, and wherein each ranker in the ranker array applies a statistical classification function to candidate answers generated by the QA system in response to an input question to generate a ranked listing of candidate answers for the ranker;

input a training question to the QA system to generate a training candidate answer set;

apply the ranker array to the training candidate answer set to generate, for each ranker in the ranker array, a corresponding ranked listing of candidate answers in the training candidate answer set;

determine, for each ranker in the ranker array, correctness of the corresponding ranked listing of candidate answers; and reconfigure the ranker array based on results of the determined correctness of the corresponding ranked listing of candidate answers for each ranker in the ranker array, wherein the instructions to generate, input, apply, determine, and reconfigure are performed iteratively over a plurality of training iterations, and wherein, for each training iteration in the plurality of training iterations, at least one of the training question or a sampling of a corpus of data upon which the training questions or ranker array operates is different from other training iterations in the plurality of training iterations.

* * * * *